United States Patent
Acheson

(10) Patent No.: US 11,435,484 B2
(45) Date of Patent: Sep. 6, 2022

(54) SPACE TIME ADAPTIVE CORRELATOR

(71) Applicant: Rockwell Collins, Inc., Cedar Rapids, IA (US)

(72) Inventor: John E. Acheson, Hiawatha, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 724 days.

(21) Appl. No.: 16/434,383

(22) Filed: Jun. 7, 2019

(65) Prior Publication Data
US 2021/0286091 A1    Sep. 16, 2021

(51) Int. Cl.
| | |
|---|---|
| *G01S 19/45* | (2010.01) |
| *H04B 17/318* | (2015.01) |
| *G01S 19/06* | (2010.01) |
| *G01S 19/23* | (2010.01) |
| *G01S 19/31* | (2010.01) |

(52) U.S. Cl.
CPC .............. *G01S 19/45* (2013.01); *G01S 19/06* (2013.01); *G01S 19/23* (2013.01); *G01S 19/31* (2013.01); *H04B 17/318* (2015.01)

(58) Field of Classification Search
CPC .......... G01S 19/45; G01S 19/06; G01S 19/23; G01S 19/31; G01S 19/252; G01S 19/428; H04B 17/318
See application file for complete search history.

(56) References Cited

U.S. PATENT DOCUMENTS

| | | | | |
|---|---|---|---|---|
| 5,588,152 A | * | 12/1996 | Dapp ................ | G06F 15/17381 712/E9.055 |
| 5,590,345 A | * | 12/1996 | Barker ................ | G06F 9/30189 712/15 |
| 5,625,836 A | * | 4/1997 | Barker .................. | G06F 15/803 712/201 |
| 5,708,836 A | * | 1/1998 | Wilkinson .......... | G06F 15/8007 712/15 |
| 5,717,944 A | * | 2/1998 | Wilkinson ............ | G06F 9/3802 712/E9.055 |
| 5,734,921 A | * | 3/1998 | Dapp .................... | G06F 9/3802 712/E9.055 |
| 5,794,059 A | * | 8/1998 | Barker ................ | G06F 9/30036 712/15 |

(Continued)

*Primary Examiner* — Ankur Jain
(74) *Attorney, Agent, or Firm* — Suiter Swantz pc llo

(57) ABSTRACT

A global navigation satellite system (GNSS) receiver is disclosed. In embodiments, the GNSS receiver includes a tracking engine running on a primary controller, the tracking engine configured to receive a plurality of signals from a plurality of satellites. The GNSS receiver further includes a space-time adaptive correlator (STAC) engine running on an application-specific controller. In embodiments, the STAC engine is configured to: receive initial position data and an initial receiver clock estimate from the tracking engine; construct a spatial hypercube based on the received initial position data; receive the plurality of signals from the tracking engine; interpolate signal strengths of the plurality of signals to generate a plurality of signal intensity curves; integrate the plurality of signal intensity curves within the spatial hypercube for the initial receiver clock estimate to generate a signal intensity hypercube plot; and determine a receiver position based on the signal intensity hypercube plot.

20 Claims, 9 Drawing Sheets

(56) References Cited

U.S. PATENT DOCUMENTS

| | | | | |
|---|---|---|---|---|
| 5,963,745 A * | 10/1999 | Collins | ............ | G06F 15/17343 |
| | | | | 712/E9.055 |
| 5,963,746 A * | 10/1999 | Barker | ................ | G06F 15/8007 |
| | | | | 712/E9.071 |
| 5,966,528 A * | 10/1999 | Wilkinson | ............ | G06F 9/3885 |
| | | | | 712/E9.055 |
| 2007/0239992 A1 * | 10/2007 | White | .................. | B60K 28/063 |
| | | | | 713/186 |
| 2010/0227680 A1 * | 9/2010 | Leopold | ................. | G07F 17/32 |
| | | | | 463/29 |
| 2010/0316158 A1 * | 12/2010 | Arne | .................... | A61B 5/0028 |
| | | | | 375/345 |
| 2015/0106306 A1 * | 4/2015 | Birdwell | ............. | G06N 3/0635 |
| | | | | 706/11 |
| 2021/0286091 A1 * | 9/2021 | Acheson | ................ | G01S 19/06 |
| 2021/0349157 A1 * | 11/2021 | Srinivasan | .......... | H01M 10/425 |
| 2022/0026920 A1 * | 1/2022 | Ebrahimi Afrouzi | ........................ | |
| | | | | B25J 9/1664 |
| 2022/0066456 A1 * | 3/2022 | Ebrahimi Afrouzi | ..... | A47L 9/30 |
| 2022/0084085 A1 * | 3/2022 | Rigetti | ................... | G06N 10/20 |
| 2022/0117121 A1 * | 4/2022 | Heydari | ............... | H05K 7/1492 |

* cited by examiner

SPACE TIME ADAPTIVE CORRELATOR

BACKGROUND

The accuracy and precision of traditional signal receivers, including Global Navigation Satellite System (GNSS) receivers, is typically dependent on signal strengths of received signals. Accordingly, most traditional GNSS receivers may exhibit poor performance (e.g., low accuracy, low precision) in low signal strength environments, such as indoors and under tree canopies. High-dynamic environments associated with high-dynamic vehicles (e.g., jet aircrafts, missiles, etc.) may also result in low signal strengths, rendering most traditional GNSS receivers incompatible with these high-dynamic environments.

Additionally, while there are some techniques which are able to maintain high performance (e.g., high accuracy, high precision) in low signal strength environments, these techniques require very high levels of computational power, thereby resulting in large, heavy GNSS receivers which are ill-suited for small, portable devices, such as radios, cellular phones, or other handheld devices.

Therefore, it would be desirable to provide a system and method that cure one or more of the shortfalls of the previous approaches identified above.

SUMMARY

A global navigation satellite system (GNSS) receiver is disclosed. In one or more embodiments, the GNSS receiver includes a tracking engine running on a primary controller, the tracking engine configured to receive a plurality of signals from a plurality of satellites. The GNSS receiver further includes a space-time adaptive correlator (STAC) engine running on an application-specific controller. In embodiments, the STAC engine is configured to: receive initial position data from the tracking engine; receive an initial receiver clock estimate from the tracking engine; construct a spatial hypercube within a spatial coordinate system based on the received initial position data; receive the plurality of signals from the tracking engine; interpolate signal strengths of the plurality of signals to generate a plurality of signal intensity curves; integrate the plurality of signal intensity curves within the spatial hypercube for the initial receiver clock estimate to generate a signal intensity hypercube plot; and determine a receiver position based on the signal intensity hypercube plot.

A method for determining a receiver position is disclosed. In one or more embodiments, the method includes: receiving, with a space-time adaptive correlator (STAC) engine running on an application-specific controller, initial position data from a tracking engine running on a primary controller; receiving an initial receiver clock estimate from the tracking engine; constructing a spatial hypercube within a spatial coordinate system based on the received initial position data; receiving a plurality of signals from a plurality of satellites from the tracking engine; interpolating signal strengths of the plurality of signals to generate a plurality of signal intensity curves; integrating the plurality of signal intensity curves within the spatial hypercube for the initial receiver clock estimate to generate a signal intensity hypercube plot; and determining a receiver position based on the signal intensity hypercube plot.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are provided for example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION

Figure 1:
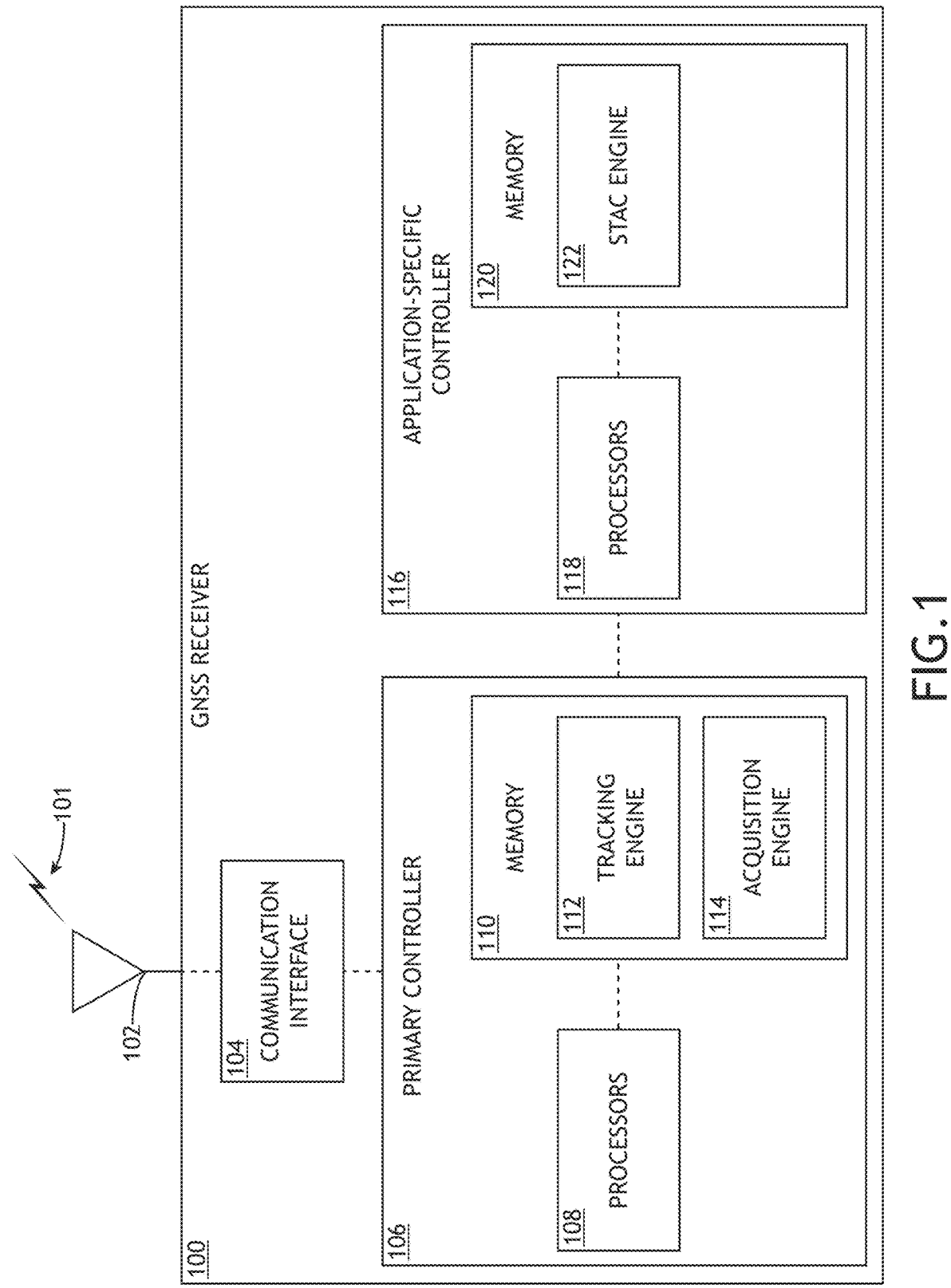
FIG. 1 illustrates a simplified block diagram of a Global Navigation Satellite System (GNSS) receiver, in accordance with one or more embodiments of the present disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of sub-combination of two or more such features, along with any other features which may not necessarily be expressly described or inherently present in the instant disclosure.

As noted previously herein, the accuracy and precision of traditional signal receivers, including Global Navigation Satellite System (GNSS) receivers, is typically dependent on signal strengths of received signals. In this regard, most traditional GNSS receivers may exhibit poor performance (e.g., low accuracy, low precision) in low signal strength environments, such as indoors and under tree canopies. High-dynamic environments associated with high-dynamic vehicles (e.g., jet aircrafts, missiles, etc.) may also result in low signal strengths, rendering most traditional GNSS receivers incompatible with these high-dynamic environments.

Additionally, while there are some techniques which are able to maintain high performance (e.g., high accuracy, high precision) in low signal strength environments, these techniques require incredible levels of computational power, thereby resulting in large, heavy GNSS receivers which are ill-suited for small, portable devices, such as radios, cellular phones, or other handheld devices.

Accordingly, embodiments of the present disclosure are directed to a GNSS receiver and method which cure one or more of the shortfalls of the previous receivers identified above. Embodiments of the present disclosure are directed to the use of an application-specific controller configured to run a Space Time Adaptive Correlator (STAC) engine. Additional embodiments of the present disclosure are directed to a STAC engine configured to run on an application-specific integrated circuit (ASIC) and/or field-programmable gate array (FPGA) which carries out composite vector tracking to improve position information even in low signal strength environments and/or environments with high levels of interference. Further embodiments of the present disclosure are directed to a receiver configured to carry out composite vector tracking algorithms which are carried out on both hardware and software components.

It is contemplated herein that embodiments of the present disclosure may improve performance of GNSS receivers in low signal strength environments, high-dynamic environments (e.g., aboard a jet aircraft or missile), and environments with high levels of interference. For instance, it has been found that embodiments of the present disclosure may provide for approximately 10 dB processing gain over traditional receivers. Furthermore, it is contemplated herein that techniques of the present disclosure may be carried out by a receiver which is significantly smaller than currently available receivers with similar performance levels, such as in a handheld or wearable device.

FIG. 1 illustrates a simplified block diagram of a Global Navigation Satellite System (GNSS) receiver 100, in accordance with one or more embodiments of the present disclosure. The GNSS receiver 100 may include, but is not limited to, one or more antennas 102, a communication interface 104, a primary controller 106 configured to run a tracking engine 112 and an acquisition engine 114, and an application-specific controller 116 configured to run a Space Time Adaptive Correlator (STAC) engine 122.

The GNSS receiver 100 may include any GNSS receiver known in the art configured to receive satellite signals 101 from one or more satellite vehicles. In this regard, the GNSS receiver 100 of the present disclosure may be incorporated into any device to provide GNSS positional information. For example, the GNSS receiver 100 of the present disclosure may be incorporated into handheld devices (e.g., radios, mobile phones, smart phones), vehicles (e.g., automobiles, all-terrain vehicles, aquatic vehicles, aircraft), wearable devices (e.g., smart watches), and the like.

The one or more antennas 102 may include any antenna devices known in the art which are configured to receive a plurality of signals 101 from a plurality of satellite vehicles. In embodiments, the one or more antennas 102 are communicatively coupled to the communication interface 104 of the GNSS receiver 100. The communication interface 104 can be operatively configured to communicate with components of the GNSS receiver 100. For example, the communication interface 104 can be configured to retrieve data from the primary controller 106 or application-specific controller 116 or other devices (e.g., other GNSS receivers 100), transmit data for storage in a memory 110, 120, retrieve data from storage in the memory 110, 120, and so forth. The communication interface 104 can also be communicatively coupled with the primary controller 106 to facilitate data transfer between components of the GNSS receiver 100 and the primary controller 106. It should be noted that while the communication interface 104 is described as a component of the GNSS receiver 100, one or more components of the communication interface 104 can be implemented as external components communicatively coupled to the GNSS receiver 100 via a wired and/or wireless connection. GNSS receiver 100 may also include and/or connect to one or more input/output (I/O) devices. In embodiments, the communication interface 104 includes or is coupled to a transmitter, receiver, transceiver, physical connection interface, or any combination thereof.

In embodiments, the communication interface 104 is configured to receive the plurality of signals 101 from the one or more antennas 102 and provide the plurality of signals to the primary controller 106. The primary controller 106 may provide processing functionality for at least the GNSS receiver 100 and can include any number of processors, micro-controllers, circuitry, field programmable gate array (FPGA) or other processing systems, and resident or external memory for storing data, executable code, and other information accessed or generated by the GNSS receiver 100. For example, as shown in FIG. 1, the primary controller 106 may include one or more processors 108 and a memory 110. The one or more processors 108 may be configured to execute one or more sets of program instructions embodied in a non-transitory memory medium (e.g., memory 110), the sets of program instructions configured to cause the one or more processors 108 to carry out various steps and functions of the present disclosure. The primary controller 106 is not limited by the materials from which it is formed or the processing mechanisms employed therein and, as such, can be implemented via semiconductor(s) and/or transistors (e.g., using electronic integrated circuit (IC) components), and so forth.

The memory 110 can be an example of tangible, computer-readable storage medium that provides storage functionality to store various data and/or program code associated with operation of the GNSS receiver 100/primary controller 106, such as software programs and/or code segments, or other data to instruct the primary controller 106. It should be noted that while a single memory 110 is described, a wide variety of types and combinations of memory (e.g., tangible, non-transitory memory) can be employed. The memory 110 can be integral with the primary controller 106, can comprise stand-alone memory, or can be a combination of both. Some examples of the memory 110 can include removable and non-removable memory components, such as random-access memory (RAM), read-only memory (ROM), flash memory (e.g., a secure digital (SD) memory card, a mini-SD memory card, and/or a micro-SD memory card), solid-state drive (SSD) memory, magnetic memory, optical memory, universal serial bus (USB) memory devices, hard disk memory, external memory, and so forth.

In embodiments, the memory 110 may be configured to store a tracking engine 112 and an acquisition engine 114. In embodiments, the tracking engine 112 and the acquisition engine 114 include software programs including program instructions configured to be carried out by the one or more processors 108. In this regard, it may be said that the tracking engine 112 and the acquisition engine 114 are run on the primary controller 106 in that the one or more processors 108 of the primary controller 106 are configured to execute the program instructions associated with the tracking engine 112 and/or the acquisition engine 114.

In embodiments, the primary controller 106 is communicatively coupled to an application-specific controller 116. The application-specific controller 116 may include one or more processors 108 and a memory 120. The application-specific controller 116 may include any application-specific controller, device, or circuit known in the art including, but not limited to, an application-specific integrated circuit (ASIC), custom field-programmable gate array (FPGA), and the like. The one or more processors 108 may be configured to execute one or more sets of program instructions stored in memory 120, the sets of program instructions configured to cause the one or more processors 118 to carry out various steps/functions of the present disclosure.

It is noted herein that any discussion regarding various components of the primary controller 106 (e.g., primary controller 106, processors 108, memory 110) may be regarded as applying to the various components of the application-specific controller 116 (e.g., application-specific controller 116, processors 108, memory 120), unless noted otherwise herein.

For example, as noted previously herein with respect to the primary controller 106, the memory 120 of the application-specific controller 116 may be configured to store a Space Time Adaptive Correlator (STAC) engine 122. In embodiments, the STAC engine 122 includes a software program including program instructions configured to be carried out by the one or more processors 118. In this regard, it may be said that the STAC engine 122 is run on the application-specific controller 116 in that the one or more processors 118 of the application-specific controller 116 are configured to execute the program instructions associated with the SATAC engine 122.

Upon first turning on the GNSS receiver 100 (e.g., during a cold time to first fix (TTFF)), the primary controller 106 may be configured to run the acquisition engine 114 in order to identify and communicatively couple to satellite vehicles. In this regard, the primary controller 106 may be configured to run the acquisition engine 114 when neither initial position data of the GNSS receiver 100 nor an initial receiver clock estimate is known (e.g., "cold start").

After the acquisition engine 114 has identified and communicatively coupled to one or more satellites, the primary controller 106 may be configured to store estimated initial receiver position data and an initial receiver clock estimate in memory 110. The primary controller 106 may be further configured to run the tracking engine 112 to determine the position of the GNSS receiver 100 based on the one or more signals 101. In this regard, the tracking engine 112 may be configured to receive the one or more signals 101 from the one or more satellites, and determine a receiver position within a spatial coordinate system (e.g., earth-centered, earth-fixed (ECEF) coordinate system) based on the one or more received signals. The primary controller 106 may be configured to run the tracking engine 112 in order to continuously and/or intermittently determine a receiver position, and store/update the receiver position in memory 110.

As noted previously herein, the performance of many traditional receivers is dependent upon signal strengths of received signals 101. In other words, many traditional receivers may exhibit high performance when one or more signals 101 received from one or more satellites exhibit a signal strength above a particular signal strength threshold value. Conversely, traditional receivers may exhibit low performance (e.g., low accuracy and/or low precision) when the one or more received signals 101 exhibit a signal strength below the particular signal strength threshold value.

In this regard, embodiments of the present disclosure are directed toward activating/enabling the application-specific controller 116 running the STAC engine 122 in low signal strength environments in order to improve the performance of the GNSS receiver 100. In additional and/or alternative embodiments, the application-specific controller 116/STAC engine 122 may be deactivated/disabled in high signal strength environments (e.g., when one or more signals 101 exhibit a signal strength above a signal strength threshold).

For example, the tracking engine 112 may be configured to determine the receiver position based on the plurality of signals 101 when one or more signals 101 exhibit a signal strength above a signal strength threshold value (e.g., in high signal strength environments). Subsequently, the GNSS receiver 100 may move, become obstructed, or otherwise enter a low signal strength environment in which each signal 101 of the plurality of signals 101 exhibits a signal strength below the signal strength threshold value. In embodiments, the tracking engine 112 may be further configured to activate the STAC engine 122 from an inactive state to an active state when each signal 101 of the plurality of signals 101 exhibits a signal strength below the signal strength threshold value. In this regard, in some embodiments, the STAC engine 122 may be in an inactive state prior to activation by the tracking engine 122, such that the application-specific controller 116/STAC engine 122 is activated only when necessary. Conversely, when the GNSS receiver 100 returns to a high signal strength environment, the tracking engine 112 may be further configured to deactivate the STAC engine 122 from the active state to the inactive state when at least one signal 101 of the plurality of signals 101 exhibits a signal strength above the signal strength threshold value. Accordingly, in some embodiments, the application-specific controller 116/STAC engine 122 may be actuated by the primary controller 106/tracking engine 112 on an as-needed basis, such that it is activated in low signal strength environments, and inactivated in high signal strength environments.

Upon activation, the one or more processors 118 of the application-specific controller 116 may be configured to run/execute the STAC engine 122 in order to carry out various steps/functions of the present disclosure. Broadly, the STAC engine 122 running on the application-specific controller 116 may be configured to: receive initial position data from the tracking engine 112; receive an initial receiver clock estimate from the tracking engine 112; construct a spatial hypercube within a spatial coordinate system based on the received initial position data; receive the plurality of signals from the tracking engine 112; interpolate signal strengths of the plurality of signals to generate a plurality of signal intensity curves; integrate the plurality of signal intensity curves within the spatial hypercube for the initial receiver clock estimate to generate a signal intensity hypercube plot; and determine a receiver position based on the signal intensity hypercube plot. Each of these steps will be addressed in turn.

In embodiments, the STAC engine 122 is configured to receive initial position data from the tracking engine 112. Similarly, in some embodiments, the STAC engine 122 is further configured to receive an initial receiver clock estimate from the tracking engine 112. Upon activation, the initial position data and the initial receiver clock estimate received from the tracking engine 112 may provide the STAC engine 122 with initial estimates as to the estimated position of the GNSS receiver 100 and an estimated receiver clock time, at the time of activation of the STAC engine 122.

In embodiments, the STAC engine 122 may be further configured to construct a spatial hypercube within a spatial coordinate system based on the received initial position data. This may be further understood with reference to FIGS. 2A-2B.

Figure 2A:
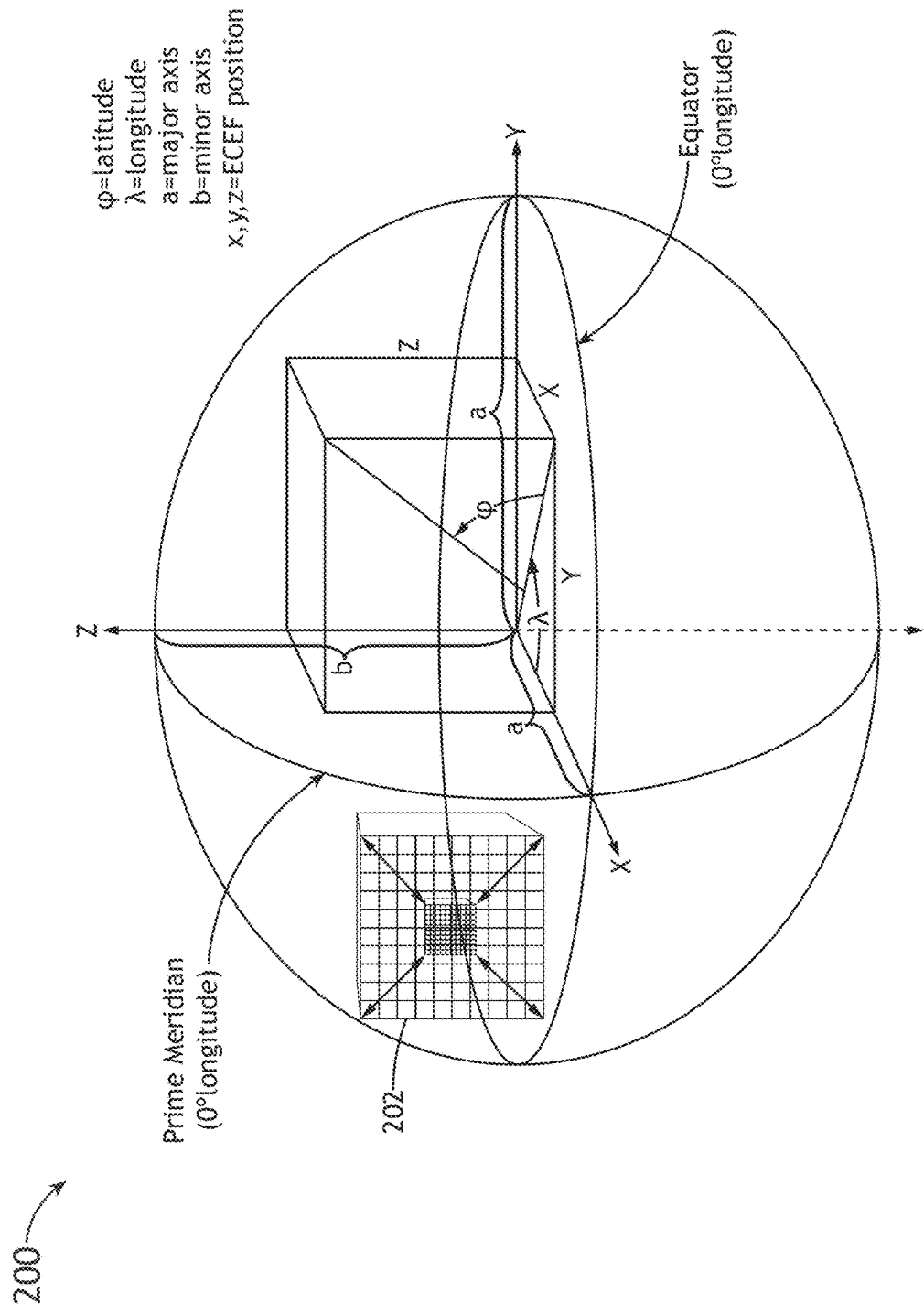
FIG. 2A illustrates the generation of a spatial hypercube in spatial coordinate system, in accordance with one or more embodiments of the present disclosure.
Figure 2B:
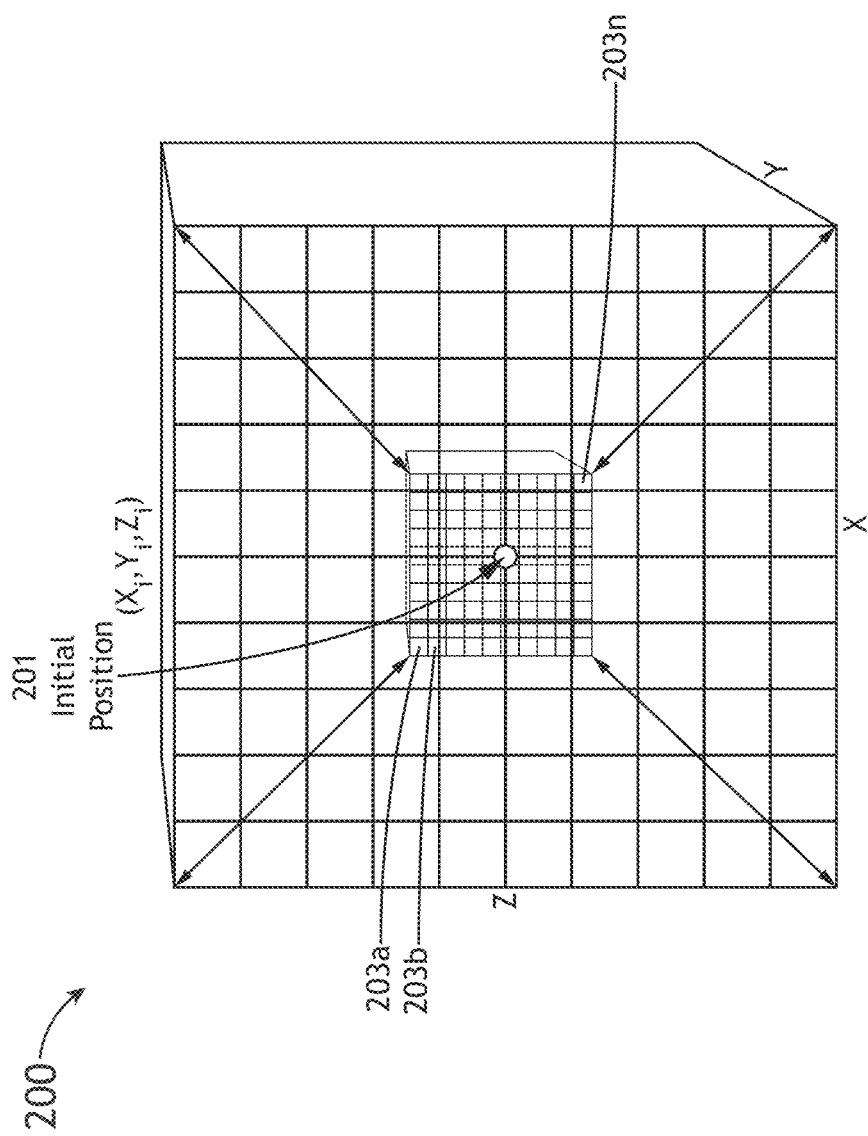
FIG. 2B illustrates the generation of a spatial hypercube in spatial coordinate system, in accordance with one or more embodiments of the present disclosure.

FIG. 2A illustrates the generation of a spatial hypercube 202 in spatial coordinate system 200, in accordance with one or more embodiments of the present disclosure. FIG. 2B illustrates the generation of a spatial hypercube 202 in spatial coordinate system 200, in accordance with one or more embodiments of the present disclosure.

It is contemplated herein that the spatial hypercube 202 may be constructed within any spatial coordinate system 200 known in the art. For example, as shown in FIG. 2A, the spatial hypercube 202 may be constructed within an earth-centered, earth-fixed (ECEF) coordinate system defined by X, Y, and Z coordinates. By way of another example, the spatial hypercube 202 may be constructed within a spherical or polar coordinate system 200.

As shown in FIG. 2B, the STAC engine 122 may be configured to generate a spatial hypercube 202 within a spatial coordinate system 200 based on the received initial position data, wherein the spatial hypercube 202 is constructed such that the initial receiver position estimate (e.g., initial position data) is contained within the spatial hypercube 202. For example, the spatial hypercube 202 may be constructed such that an initial receiver position estimate 201 (e.g., initial position data), defined as $(X_i, Y_i, Z_i)$, is positioned at the center of the spatial hypercube 202. In embodiments, the spatial hypercube 202 may be constructed as a plurality of smaller cubelets 203a, 203b, 203n, such that the plurality of cubelets 203a, 203b, 203n together make up the spatial hypercube 202.

In embodiments, the STAC engine 122 may be configured to construct the spatial hypercube 202 based on the initial position data in order to provide for a certain margin of error. For example, where the initial position data is determined to estimate the position of the GNSS receiver 100 to a high degree of precision, the STAC engine 122 may be configured to construct a smaller spatial hypercube 202. Conversely, where the initial position data is determined to estimate the position of the GNSS receiver 100 to a low degree of precision, the STAC engine 122 may be configured to construct a larger spatial hypercube 202. In this regard, the size of the spatial hypercube 202 may be determined as a function of the precision/accuracy of the initial position data.

In embodiments, constructing the spatial hypercube 202 may include defining relative positions of the cubelets 203a-203n as a function of an initial position estimate 201. For example, the STAC engine 122 may be configured to receive an initial position estimate 201 (e.g., initial position data) in XYZ coordinates, defined as $(X_i, Y_i, Z_i)$. The STAC engine 122 may then be configured to define the location of each cubelet 203a-203n by dimensional scaling vectors such that the location of cubelet 203n, may be defined as: $CubeX_n = X_i + ScaleVector(X_n), CubeY_n = Y_i + ScaleVector(Y_n)$, and $CubeZ_n = Z_i + ScaleVector(Z_n)$, wherein the coordinates of cubelet 203n are defined as $(CubeX_n, CubeY_n, CubeZ_n)$.

Figure 3:
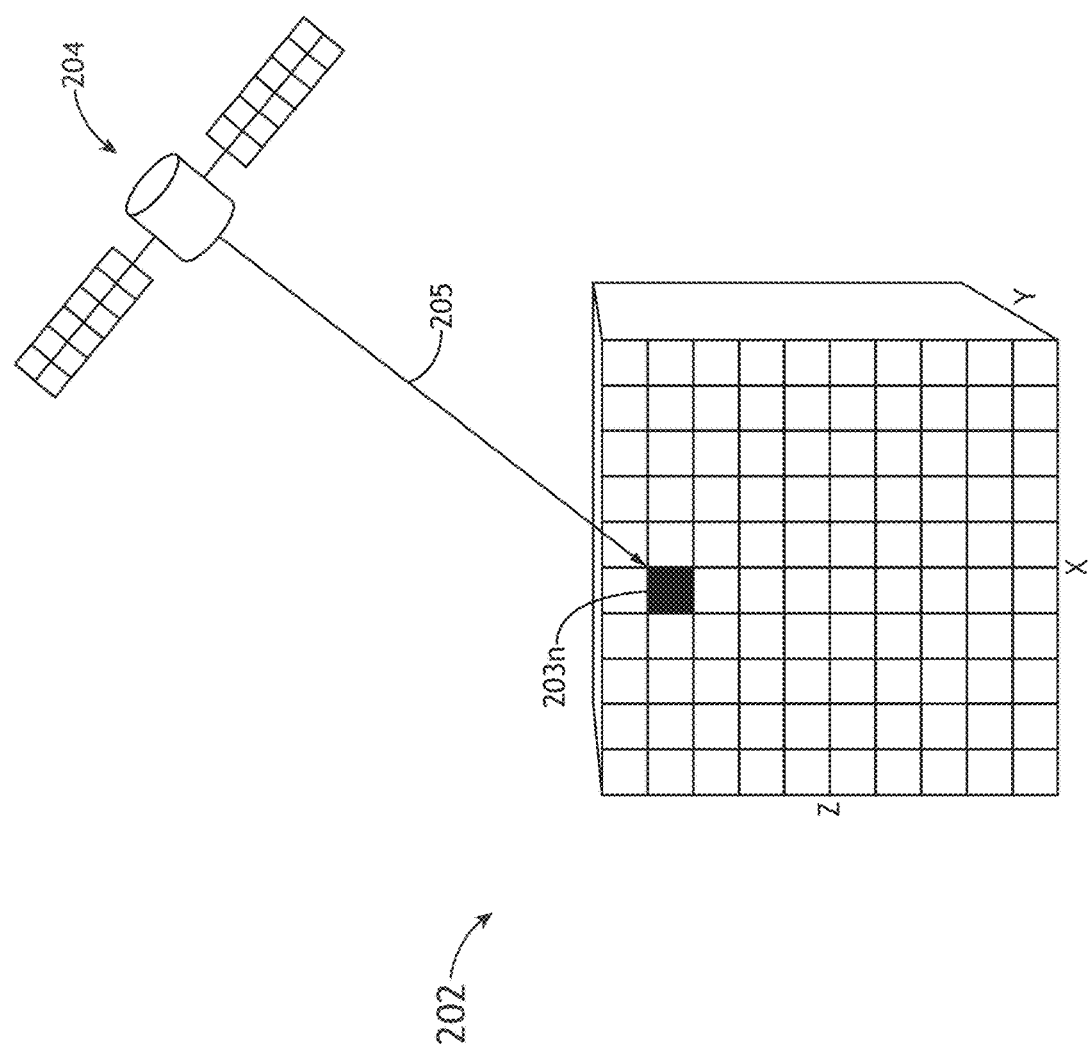
FIG. 3 illustrates the computation of a satellite vehicle location, in accordance with one or more embodiments of the present disclosure.

In embodiments, the STAC engine 122 is further configured to receive the plurality of signals 101 from the tracking engine 112. In some embodiments, the STAC engine 122 may be configured to receive signals 101 from the top statistical satellite vehicle candidates. In other words, signals 101 from satellite vehicles which exhibit the strongest signal strengths may be provided as inputs to the STAC engine 122. The STAC engine 122 may then be configured to determine the range of the one or more satellite vehicles (e.g., satellites) from the spatial hypercube 202 based on the plurality of signals 101. For example, FIG. 3 illustrates the computation of a satellite vehicle 204 location, in accordance with one or more embodiments of the present disclosure. As shown in FIG. 3, the STAC engine 122 may be configured to determine an ephemeris of one or more satellite vehicles 204 in order to determine a cell range 205 of the one or more satellite vehicles 204.

Figure 4:
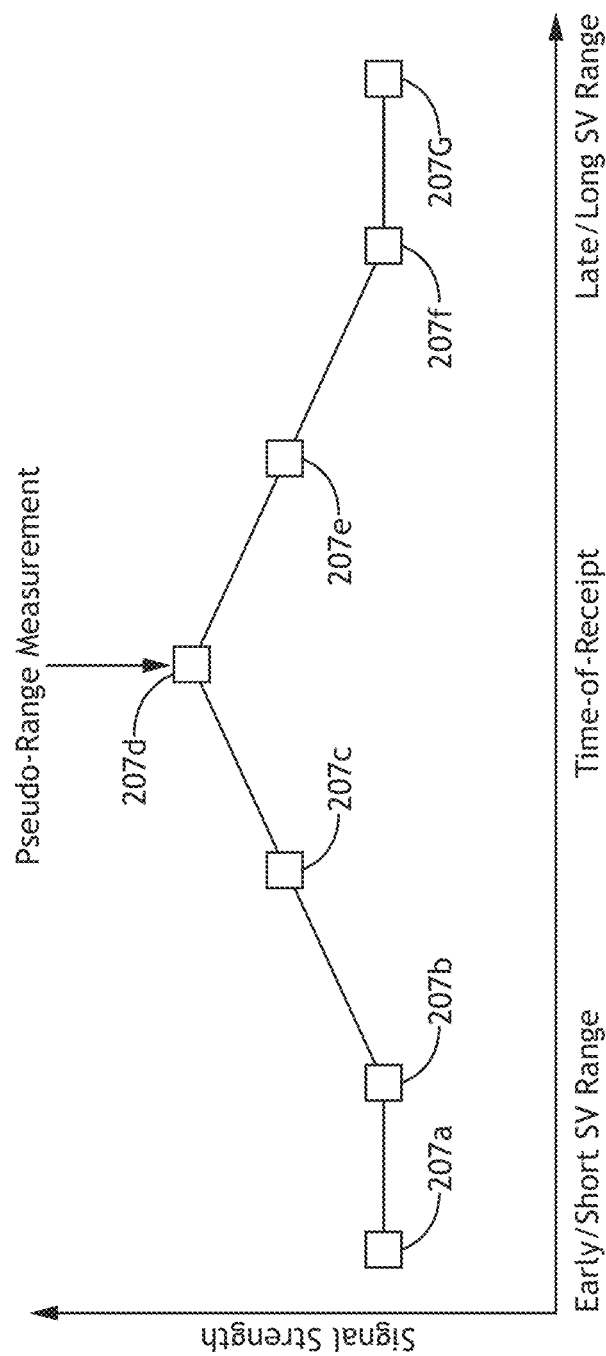
FIG. 4 illustrates the interpolation of signal strengths to generate a signal intensity curve, in accordance with one or more embodiments of the present disclosure.

FIG. 4 illustrates the interpolation of signal strengths to generate a signal intensity curve 206, in accordance with one or more embodiments of the present disclosure. In embodiments, the STAC engine 122 is configured to interpolate signal strengths of the plurality of signals 101 to generate a plurality of signal intensity curves 206. A signal intensity curve 206 may represent intensities of signals 101 received from a single satellite vehicle 204 as a function of the time-of-arrival of each signal 101.

The GNSS receiver 100 may receive signals 101 from a satellite vehicle 204. Signals 101 transmitted by the satellite vehicles 204 are embedded/encoded with a transmission time-stamp indicating the time each signal 101 was transmitted from the satellite vehicle 204. Similarly, the tracking engine 112 and/or the STAC engine 122 may be configured to mark each received signal with a time-of-arrival time-stamp, indicating a time each signal 101 was received. The "signal propagation time" may be defined as the difference between the transmission time-stamp and the time-of-arrival time-stamp. The tracking engine 112 and/or the STAC engine 122 may then be configured to estimate a cell range 205 from each respective satellite vehicle 204 based on the signal propagation time (e.g., transmission time-stamps, time-of-arrival time-stamps), and a propagation speed of the signals 101.

Assuming ideal conditions, signals 101 will propagate through space and the atmosphere at the speed of light. However, in practice, various factors cause the propagation of the signals 101 to deviate from ideal behavior. For example, the ionosphere and multipath propagation may result in signal deviations, which may affect the signal propagation time. Furthermore, signal deviations (e.g., ionosphere effects, multipath) may not affect signals 101 uniformly, thereby resulting in signals 101 from a single satellite vehicle 204 to be received at different times (e.g., different time-of-arrival time-stamps). Due to the fact that cell range 205 estimations are dependent upon the time the signals 101 propagated from the satellite vehicle 204 to the GNSS receiver 100, varying time-of-arrival time-stamps are indicate different cell ranges 205.

For example, a satellite vehicle 204 may transmit signals 101 to a GNSS receiver 100. Due to multipath propagation and other signal deviations, signals 101 may arrive at the GNSS receiver 100 at varying times (e.g., varying time-of-arrival time-stamps). This may be represented as a plurality of channel taps 207a-207n in FIG. 4. In the context of the present disclosure, the term "channel tap 207" may be used to denote points along the signal intensity curve 206 corresponding to particular signal delays, which may be attributable to signal deviations, such as multipath propagation. In this regard, the signal intensity curve 206 represents a summation of signal intensities received by the GNSS receiver 100 over time.

For instance, the first signal 101 received from a satellite vehicle 204 by the GNSS receiver 100 will have the earliest time-of-arrival time-stamp, and will appear to have had the shortest signal propagation time. Thus, the first signal 101 may be said to have arrived "early," indicating a short cell range 205, which may be represented along the signal intensity curve 206 as the first channel tap 207a. Conversely, signals received at a later point in time will have later time-of-arrival time-stamps, and will appear to have had longer signal propagation times. These later signals may be said to have arrived "late," indicating a longer cell range 205, and may be represented along the signal intensity curve 206 as channel taps 207f-207n. In practice, graphing the signal strengths against the signal propagation times for the plurality of signals 101 received from a satellite vehicle 204 may generate the signal intensity curve 206. The peak of the signal intensity curve 206 (e.g., channel tap 207d in FIG. 4) may be referred to as the "pseudo-range measurement."

It is noted herein that many traditional GNSS receivers 100 generate position estimates based solely on calculated pseudo-range estimates. For example, a tracking engine 112 of a traditional receiver may generate the signal intensity curve 206 illustrated in FIG. 4, discard all the raw data of the signal intensity curve 206 except the data directly adjacent to the pseudo-range measurement (e.g., channel tap 207d), and determine a receiver position based on the pseudo-range measurement. In this regard, many traditional receivers use individual tracking channels (e.g., track engine 112) to track individual satellites, quantize the received signal strengths to generate a pseudo-range measurement, then determine a receiver position based on the quantized pseudo-range measurement.

These practices of traditional receivers suffer from several drawbacks. First, by discarding all the raw data of a signal intensity curve 206 except for that directly adjacent to the pseudo-range measurement, traditional receivers may incorrectly identify a particular point along the signal intensity curve 206 as the correct pseudo-range measurement. For example, referring to FIG. 4, a signal intensity curve 206 may exhibit two "peaks" instead of a single peak (e.g., channel tap 207d). Two separate peaks may be the result of multipath propagation. In this example, if a tracking engine 112 of a receiver were to select the incorrect "peak" of the signal intensity curve 206 as the pseudo-range measurement, and discard the remaining raw data of the signal intensity curve 206, the tracking engine 112 may incorrectly determine the position of the receiver based on an incorrect pseudo-range measurement.

Furthermore, by not utilizing all the raw data associated with respective signal intensity curves 206, and by tracking signal energies of each satellite individually, traditional receivers are highly dependent upon high signal strength intensities. For example, if signal strengths from a particular satellite are not sufficiently high, a tracking engine 112 of a traditional receiver may disregard the signals 101 from the particular satellite vehicle 204 and search for another satellite vehicle 204 which exhibits signals 101 with signal strengths that are sufficiently high to generate a pseudo-range measurement. Accordingly, with many traditional receivers, signals 101 from satellite vehicles 204 which exhibit signal strengths below a particular signal strength threshold value are discarded/omitted from calculations for determining the receiver position. In this regard, in the event that no satellite vehicle 204 exhibits signal strengths above the signal strength threshold value, traditional receivers may be unable to determine a position of the receiver.

Figure 5B:
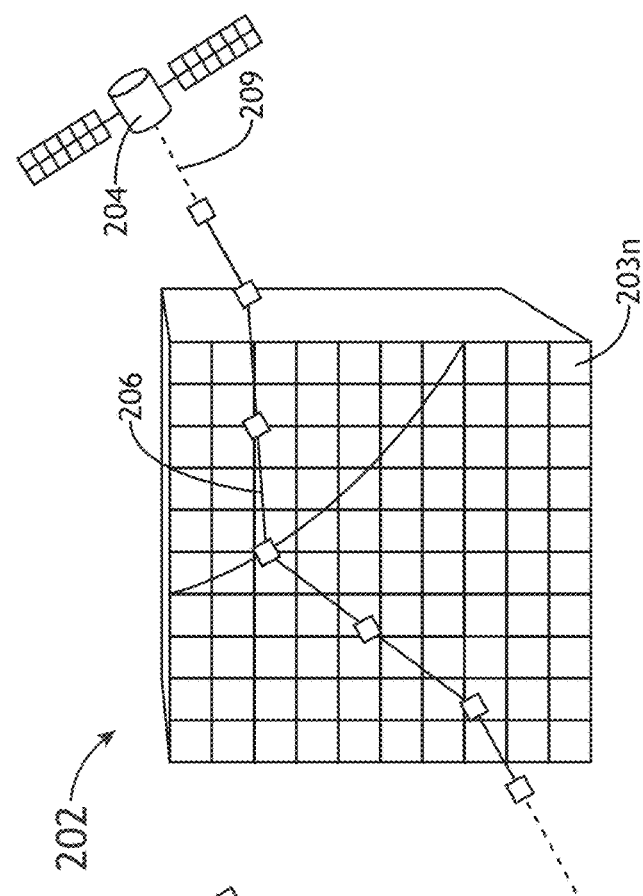
FIG. 5B illustrates a high-resolution view of a signal intensity curve plotted within a spatial hypercube, in accordance with one or more embodiments of the present disclosure.

Comparatively, embodiments of the present disclosure are directed to compiling signals 101 from a plurality of satellite vehicles 204 into signal intensity hypercube plots in order to determine a position of the GNSS receiver 100. It is contemplated herein that compiling signals 101 from a plurality of satellite vehicles 204 may allow for accurate position determination, even in environments where none of the signals 101 exhibit signal strengths above a signal strength threshold value. By way of a metaphor, a single thread may not be sufficiently strong to support a weight, but multiple threads wound together into a rope may be sufficiently strong to support the same weight. Similarly, while a single set of signals 101 from a single satellite vehicle 204 may not be sufficiently strong to support an accurate receiver position determination, multiple sets of signals 101 compiled into a single signal intensity hypercube plot may be sufficient to support an accurate position determination. This concept may be further understood with reference to FIGS. 5A-6B FIG. 5A illustrates a low-resolution view of a signal intensity curve 206 plotted within a spatial hypercube 202, in accordance with one or more embodiments of the present disclosure. FIG. 5B illustrates a high-resolution view of a signal intensity curve 206 plotted within a spatial hypercube 202, in accordance with one or more embodiments of the present disclosure.

In embodiments, the STAC engine 122 is configured to plot the one or more generated signal intensity curves 206 within the spatial hypercube 202. For example, as shown in FIGS. 5A-5B, the STAC engine 122 may be configured to plot the one or more generated signal intensity curves 206 along a line of sight 209 of each respective satellite vehicle 204, such that a first signal intensity curve 206a associated with a first satellite vehicle 204a is plotted along a first line of sight 209a from the first satellite vehicle 204a, and a second signal intensity curve 206b associated with a second satellite vehicle 204b is plotted along a second line of sight 209b from the second satellite vehicle 204b.

In embodiments, the STAC engine 122 may be configured to adjust a resolution of the STAC engine 122. For example, FIG. 5A illustrates a low-resolution view of a signal intensity curve 206 plotted within a spatial hypercube 202. As shown in FIG. 5A, the large volume of the spatial hypercube 202 may cast a large search volume, result in more than one channel taps 207 per cubelet 203, and lead to a lower-resolution position determination (e.g., lower accuracy, lower precision). Comparatively, FIG. 5B illustrates a high-resolution view of a signal intensity curve 206 plotted within a spatial hypercube 202. As compared to FIG. 5A, the smaller volume of the spatial hypercube 202 in FIG. 5B may cast a smaller search volume, result in less than one channel taps 207 per cubelet 203, and lead to a higher-resolution position determination (e.g., higher accuracy, higher precision).

Figure 5A:
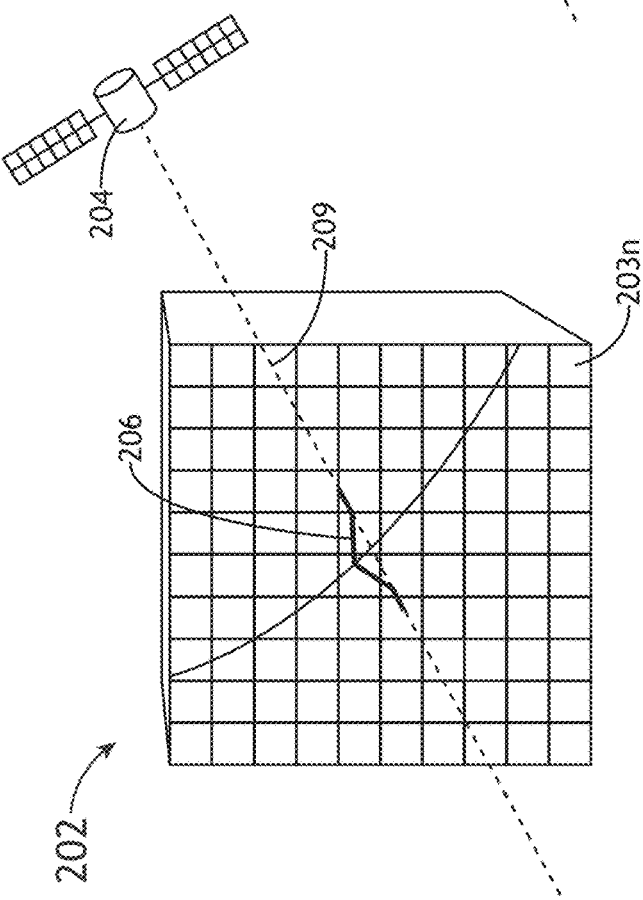
FIG. 5A illustrates a low-resolution view of a signal intensity curve plotted within a spatial hypercube, in accordance with one or more embodiments of the present disclosure.

As shown in FIG. 5A, the one or more signal intensity curves 206 may be plotted through the spatial hypercubes 202 along a line of sight 209 of each respective satellite vehicle 204. For example, a first signal intensity curve 206a corresponding to a first satellite vehicle 204a may be plotted within a spatial hypercube 202 along a first line of sight 209a of the first satellite vehicle 204a, and a second signal intensity curve 206b corresponding to a second satellite vehicle 204b may be plotted within a spatial hypercube 202 along a second line of sight 209b of the second satellite vehicle 204b.

In another embodiment, the STAC engine 122 is configured to integrate the plurality of signal intensity curves 206 within a spatial hypercube 202 for the initial receiver clock estimate to generate a signal intensity hypercube plot. This may be further understood with reference to FIGS. 6A-6B.

Figures 6A, 6B:
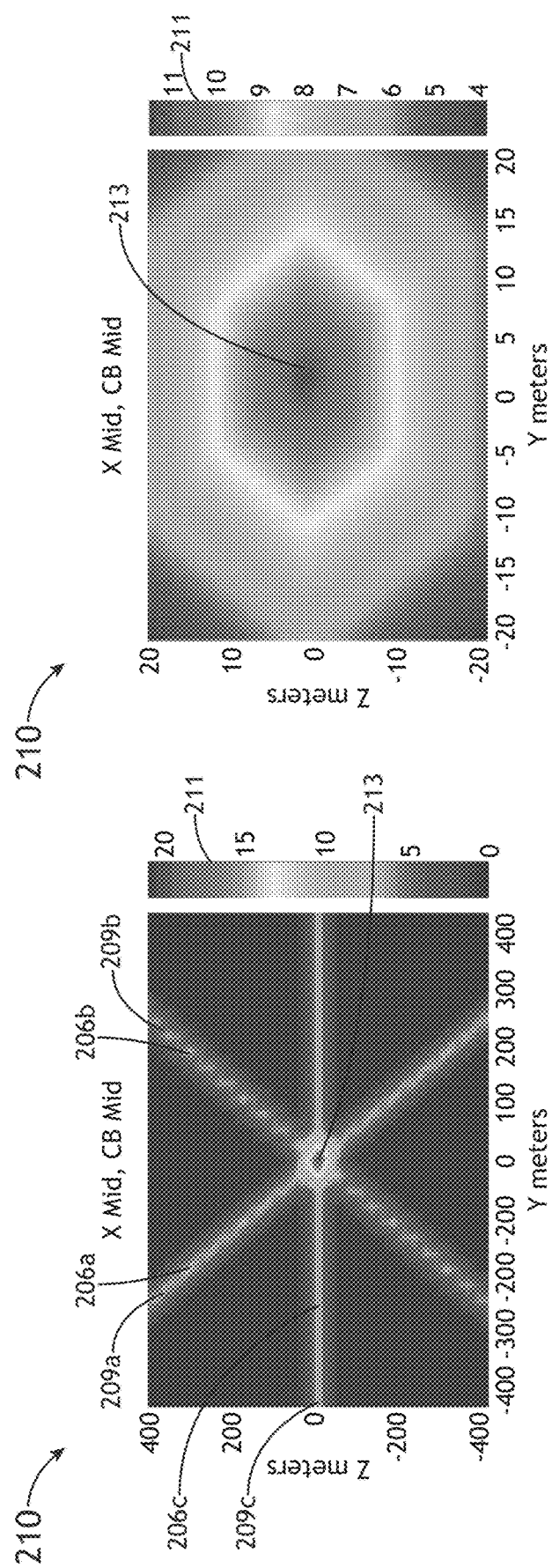
FIG. 6A illustrates a low-resolution view of a signal intensity hypercube plot, in accordance with one or more embodiments of the present disclosure.
FIG. 6B illustrates a high-resolution view of a signal intensity hypercube plot, in accordance with one or more embodiments of the present disclosure.

FIG. 6A illustrates a low-resolution view of a signal intensity hypercube plot 210, in accordance with one or more embodiments of the present disclosure. In particular, FIG. 6A illustrates a signal intensity hypercube plot 210 including three signal intensity curves 206a, 206b, 206c associated with three separate satellite vehicles 204 plotted along three respective lines of sight 209a, 209b, 209c.

In embodiments, integrating the plurality of signal intensity curves 206 within a spatial hypercube 202 includes integrating interpolated signal strengths (e.g., signal energies) from each tap 207 of each signal intensity curve 206 into each cubelet 203 of the spatial hypercube 202. In this regard, in some embodiments, the plurality of signal intensity curves 206 may be integrated, along a plurality of lines of sight 209, through the entirety of the spatial hypercube 202.

As shown in FIG. 6A, a signal intensity hypercube plot 210 may illustrate combined correlated signal strength magnitudes of multiple signals 101 (e.g., multiple satellite vehicles 204) into a single spatial coordinate system 200.

Accordingly, the signal intensity hypercube plot 210 illustrates a composite signal strength plot. In some embodiments, the signal intensity hypercube plot 210 may include, or may be interpreted by, a signal intensity grayscale 211. The signal intensity grayscale 211 may be used to interpret relative composite signal strengths of the signal intensity hypercube plot 210, wherein low signal intensity grayscale 211 values indicate low composite signal strengths, and high signal intensity grayscale 211 values indicate high composite signal strengths. In this regard, a signal intensity hypercube plot 210 may be described as a signal intensity "heat map."

As noted previously herein, traditional receivers typically discard signal strength data which is not associated with an identified pseudo-range measurement. Comparatively, by plotting all signal intensity curves 206 from multiple satellite vehicles 204 into a single signal intensity hypercube plot 210, the STAC engine 122 may be configured to plot/identify total/composite signal strengths of all signals 101 combined, rather than tracking signal strengths of individual satellites separately. By plotting all signal intensity curves 206 into a single signal intensity hypercube plot 210, the STAC engine 122 may be able to identify higher total/composite signal strengths, as all the signal strengths of all the signals 101 have been amassed together.

In embodiments, the STAC engine 122 is configured to determine a receiver position based on the signal intensity hypercube plot 210 generated for the initial receiver clock estimate. In some embodiments, the STAC engine 122 may be configured to determine a receiver position based on a signal intensity hypercube plot 210 by identifying a centroid 213 of the signal intensity hypercube plot 210. For the purposes of the present disclosure, the term "centroid 213" may be used to refer to a region, point, and/or cubelet 203 within a signal intensity hypercube plot 210 which exhibits a high composite signal strength (e.g., high signal intensity grayscale 211 value). For example, as shown in FIG. 6A, the STAC engine 122 may be configured to identify the centroid 213 within the spatial intensity hypercube plot 210.

In embodiments, the STAC engine 122 may be configured to identify a centroid 213 within the signal intensity hypercube plot 210 by identifying the cubelet 203 with the strongest signal correlation response. After identifying the cubelet 203 with the strongest signal intensity correlation, the STAC engine 122 may be configured to interpolate the correlated signal strengths surrounding the identified cubelet 203 with the strongest correlation.

FIG. 6B illustrates a high-resolution view of a signal intensity hypercube plot 210, in accordance with one or more embodiments of the present disclosure. In particular, FIG. 7B illustrates an expanded view of a centroid 213 within a spatial intensity hypercube plot 210.

It is noted herein that the STAC engine 122 may be configured to identify one or more centroids 213 within a spatial intensity hypercube plot 210 using any mathematical technique, algorithm, or formula known in the art.

It is noted herein that the initial receiver clock estimate received by the tracking engine 112 may include a certain degree of error, such that the initial receiver clock estimate is offset a particular time interval from the actual universal time. In this regard, even if the signal intensity hypercube plot 210 generated for the initial receiver clock estimate is constructed perfectly, a receiver position determined based on the signal intensity hypercube plot 210 may not be accurate/precise if the initial receiver clock estimate is off. For example, if the initial receiver clock estimate is slow (e.g., behind the actual universal time), perceived signal propagation times would be shorter, indicating the receiver is closer to the particular satellite vehicles 204, which may result in a "shifted" signal intensity hypercube plot 210, thereby leading to incorrect receiver position determinations. Conversely, if the initial receiver clock estimate is fast (e.g., ahead of the actual universal time), perceived signal propagation times would be longer, indicating the receiver is further from the particular satellite vehicles 204, which may result in "shifted" signal intensity hypercube plot 201, thereby leading to incorrect receiver position determinations.

In embodiments, in order to account for potential errors in the initial receiver clock estimate, the STAC engine 122 may be configured to integrate the plurality of signal intensity curves 206 within the spatial hypercube 202 for one or more receiver clock bias offsets to generate at least one additional signal intensity hypercube plot 210. This may be further understood with reference to FIG. 7.

Figure 7:
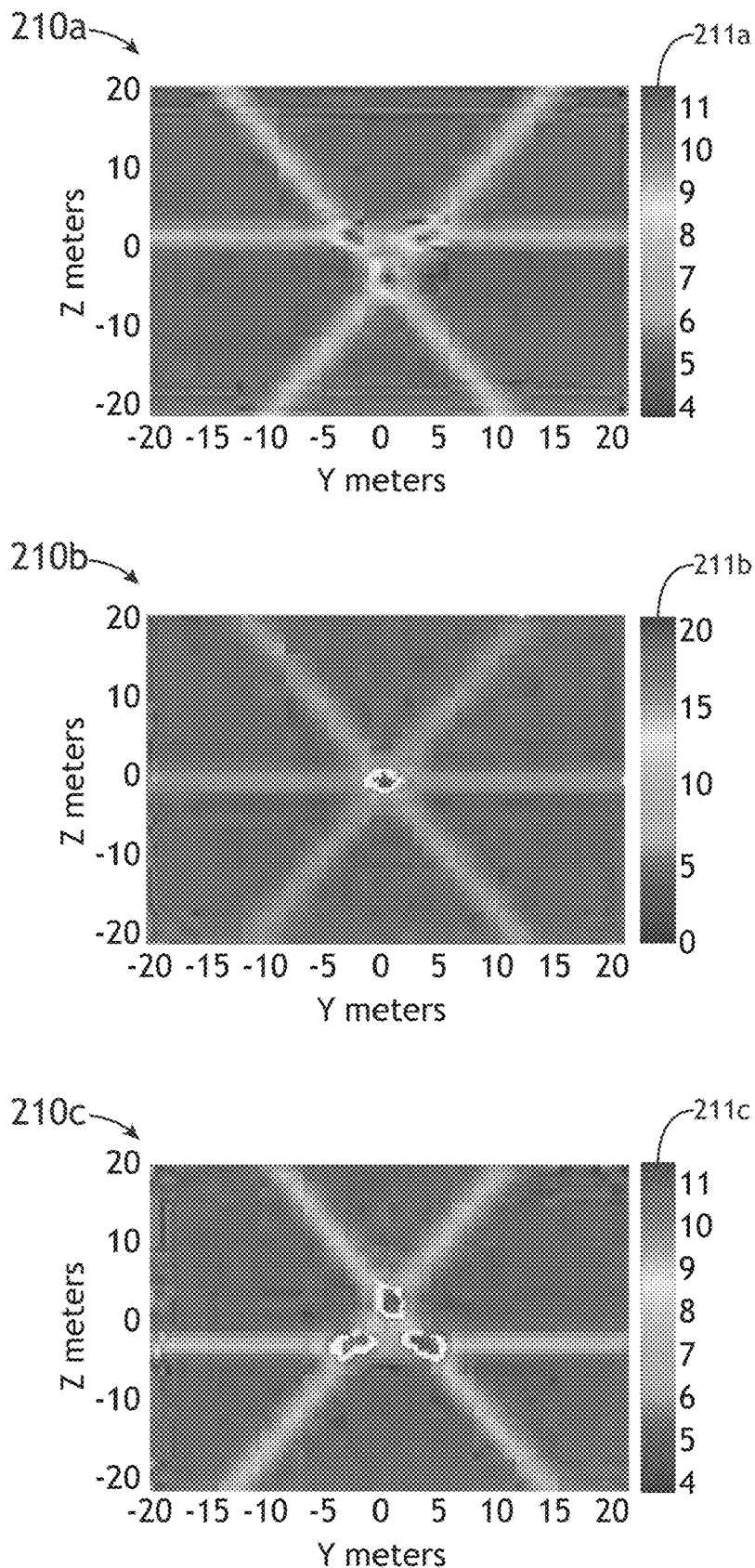
FIG. 7 illustrates a plurality of signal intensity hypercube plots for multiple receiver clock bias offsets, in accordance with one or more embodiments of the present disclosure.

FIG. 7 illustrates a plurality of signal intensity hypercube plots 210 for multiple receiver clock bias offsets, in accordance with one or more embodiments of the present disclosure. In particular, FIG. 7 illustrates a signal intensity hypercube plot 210a for the initial receiver clock estimate, a signal intensity hypercube plot 210b for a negative (e.g., slow) receiver clock bias offset, and a signal intensity hypercube plot 210c for a positive (e.g., fast) receiver clock bias offset.

In embodiments, in addition to generating a signal intensity hypercube plot 210a for the initial receiver clock estimate, the STAC engine 122 is configured to generate one or more additional signal intensity hypercube plots 210b, 210c for one or more receiver clock bias offsets. For example, the STAC engine 122 may be configured to generate a plurality of additional signal intensity curves 206 based on a negative (e.g., slow) receiver clock bias offset, then integrate the plurality of additional signal intensity curves 206 within the spatial hypercube 202 for a negative (e.g., slow) receiver clock bias offset to generate a negative-bias signal intensity hypercube plot 210b. Similarly, the STAC engine 122 may be configured to generate a plurality of additional signal intensity curves 206 based on a positive (e.g., fast) receiver clock bias offset, then integrate the plurality of additional signal intensity curves 206 within the spatial hypercube 202 for a positive (e.g., fast) receiver clock bias offset to generate a positive-bias signal intensity hypercube plot 210c. It is contemplated herein that constructing one or more additional signal intensity hypercube plots 210 for one or more receiver clock bias offsets may allow the STAC engine 122 to more accurately/precisely determine both a receiver position and a receiver clock time.

In embodiments, the STAC engine 122 is configured to determine a receiver position by comparing the one or more generated signal intensity hypercube plots 210a-210n. For example, the STAC engine 122 may be configured to determine a receiver position by identifying one or more centroids 213 within the signal intensity hypercube plots 210a, 210b, 210c, and comparing the identified centroids 213. For instance, as shown in FIG. 7, the STAC engine 122 may be configured to identify three centroids 213 the signal intensity hypercube plot 210b and signal intensity hypercube plot 210c, and a single centroid 213 within the signal intensity hypercube plot 210a. In this example, the STAC engine 122 may be configured to determine the signal intensity hypercube plot 210a as the most accurate, and therefore determine the initial receiver clock estimate as the most accurate receiver clock time. In this example, the STAC engine 122 may then be further configured to determine a receiver position based on the signal intensity hypercube plot 210a.

For example, in embodiments, the STAC engine 122 may be configured to identify the cubelet 203 with the strongest signal correlation response within the signal intensity hypercube plot 210c. After identifying the cubelet 203 with the strongest signal intensity correlation, the STAC engine 122 may be configured to interpolate the correlated signal strengths surrounding the identified cubelet 203 with the strongest correlation, and thereby identify the identified cubelet 203 and the surrounding cubelets 203 as a primary centroid. As the STAC engine interpolates correlated signal strengths surrounding the identified cubelet 203, the STAC engine 122 may identify multiple additional centroids (e.g., secondary centroids) which fall within the signal intensity correlation response of the primary centroid, and may thereby identify multiple centroids 213 within the spatial intensity hypercube plot 210c.

In some embodiments, after comparing one or more signal intensity hypercube plots 210a-210n, the STAC engine 122 may identify a signal intensity hypercube plot 210 associated with a receiver clock bias offset as the most accurate signal intensity hypercube plot 210. In these embodiments, the STAC engine 122 may then be further configured to determine a receiver position based on the signal intensity hypercube plot 210 associated with the most accurate receiver clock bias offset. Furthermore, in embodiments where the STAC engine 122 identifies a signal intensity hypercube plot 210 associated with a receiver clock bias offset as the most accurate signal intensity hypercube plot 210, the STAC engine 122 may be configured to adjust the receiver time clock estimate. For example, if the STAC engine 122 determines negative-bias signal intensity hypercube plot 210b associated with the negative (e.g., slow) receiver clock bias offset as the most accurate signal intensity hypercube plot 210, the STAC engine 122 may be configured to adjust the GNSS receiver 100 time clock estimate by setting the receiver time clock estimate as the negative receiver clock bias offset, and storing the new receiver time clock estimate in memory 110, 120.

As noted previously herein, it is contemplated that embodiments of the present disclosure may improve performance of GNSS receivers (e.g., GNSS receiver 100) in low signal strength environments, high-dynamic environments (e.g., aboard a jet aircraft or missile), and environments with high levels of interference. For example, it has been found that the application-specific controller 118/STAC engine 122 of the present disclosure may provide approximately 10 dB of signal processing gain for thirty-two tracking channels, as compared to traditional receivers. Additionally, by carrying out the steps of the present disclosure on both software and hardware components, the GNSS receiver 100 of the present disclosure may provide the aforementioned processing gains while simultaneously allowing for smaller (e.g., handheld, wearable) GNSS receivers. Furthermore, by allowing the tracking engine 112 to enable/disable the STAC engine 122, battery power/energy usage of the GNSS receiver 100 may be conserved, such that the STAC engine 122 is enabled on an as-needed basis.

Figure 8:
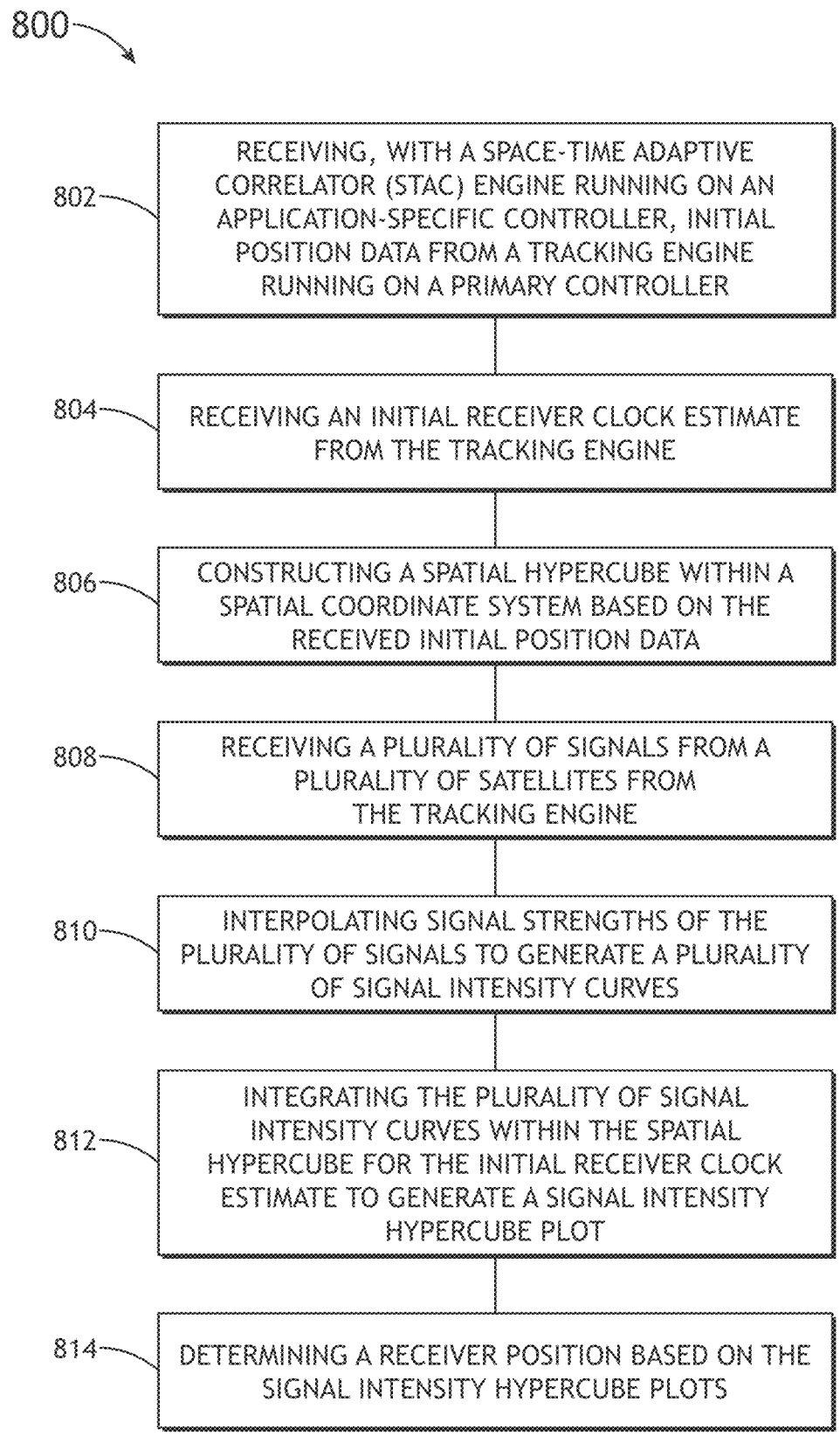
FIG. 8 illustrates a flowchart of a method for determining a receiver position, in accordance with one or more embodiments of the present disclosure.

FIG. 8 illustrates a flowchart of a method for determining a receiver position, in accordance with one or more embodiments of the present disclosure. It is noted herein that the steps of method 800 may be implemented all or in part by GNSS receiver 100. It is further recognized, however, that the method 800 is not limited to the GNSS receiver 100 in that additional or alternative system-level embodiments may carry out all or part of the steps of method 800.

In a step 802, initial position data is received, from a tracking engine running on a primary controller, by a space-time adaptive correlator (STAC) engine running on an application-specific controller. For example, as shown in FIG. 1, the STAC engine 122 running on the application-specific controller 116 may be configured to receive initial position data from the tracking engine 112 running on the primary controller 106, wherein the initial position data includes an initial receiver position estimate 201. The application-specific controller 116 may include any application-specific controller known in the art including, but not limited to, an application-specific integrated circuit (ASIC), custom field-programmable gate array (FPGA), and the like.

In a step 804, an initial receiver clock estimate is received from the tracking engine. For example, the STAC engine 122 may be configured to receive an initial receiver clock estimate from the tracking engine 112.

In a step 806, a spatial hypercube is constructed within a spatial coordinate system based on the received initial position data. For example, as shown in FIG. 2A, the STAC engine 122 may be configured to generate a spatial hypercube 202 within a spatial coordinate system 200. The spatial coordinate system 200 may include any spatial coordinate system known in the art including, but not limited to, an earth-centered, earth-fixed (ECEF) coordinate system (shown in FIG. 2A), a spherical coordinate system, a polar coordinate system, and the like. In embodiments, the spatial hypercube 202 may be constructed such that the initial receiver position estimate (e.g., initial position data) is contained within the spatial hypercube 202.

In a step 808, a plurality of signals from a plurality of satellites are received from the tracking engine. For example, as shown in FIG. 1, the tracking engine 112 may be configured to receive a plurality of signals 101 from a plurality of satellites (e.g., satellite vehicles 204). The STAC engine 122 may then be configured to receive the plurality of signals 101 from the tracking engine 112.

In a step 810, signal strengths of the plurality of signals are interpolated to generate a plurality of signal intensity curves. For example, as shown in FIG. 4, signals 101 from a satellite vehicle 204 may be interpolated to generate a signal intensity curve 206 associated with the particular satellite 204. In this regard, signal intensity curve 206 may represent intensities of signals 101 received from a single satellite vehicle 204 as a function of the time-of-arrival of each signal 101.

In a step 812, the plurality of signal intensity curves are integrated within the spatial hypercube for the initial receiver clock estimate to generate a signal intensity hypercube plot. For example, as shown in FIG. 6A, the STAC engine 122 may be configured to integrate the plurality of signal intensity curves 206 into the spatial hypercube 202 to generate a signal intensity hypercube plot 210.

In a step 214, a receiver position is determined based on the signal intensity hypercube plot. For example, the STAC engine 122 may be configured to determine a receiver position based on the signal intensity hypercube plot 210 generated for the initial receiver clock estimate. In some embodiments, the STAC engine 122 may be configured to determine a receiver position based on a signal intensity hypercube plot 210 by identifying a centroid 213 of the signal intensity hypercube plot 210.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed:

1. A global navigation satellite system (GNSS) receiver comprising:
    a tracking engine running on a primary controller, the tracking engine configured to receive a plurality of signals from a plurality of satellites; and
    a space-time adaptive correlator (STAC) engine running on an application-specific controller, the STAC engine configured to:
        receive initial position data from the tracking engine;
        receive an initial receiver clock estimate from the tracking engine;
        construct a spatial hypercube within a spatial coordinate system based on the received initial position data;
        receive the plurality of signals from the tracking engine;
        interpolate signal strengths of the plurality of signals to generate a plurality of signal intensity curves;
        integrate the plurality of signal intensity curves within the spatial hypercube for the initial receiver clock estimate to generate a signal intensity hypercube plot; and
        determine a receiver position based on the signal intensity hypercube plot.

2. The GNSS receiver of claim 1, wherein the application-specific controller comprises at least one of an application-specific integrated circuit (ASIC) or a field programmable gate array (FPGA).

3. The GNSS receiver of claim 1, wherein the STAC engine is further configured to:
    integrate the plurality of signal intensity curves within the spatial hypercube for one or more receiver clock bias offsets to generate at least one additional signal intensity hypercube plot.

4. The GNSS receiver of claim 3, wherein integrating the plurality of signal intensity curves within the spatial hypercube for one or more receiver clock bias offsets to generate at least one additional signal intensity hypercube plot comprises:
    integrating the plurality of signal intensity curves within the spatial hypercube for a positive receiver clock bias offset to generate a positive-bias signal intensity hypercube plot; and
    integrating the plurality of signal intensity curves within the spatial hypercube for a negative receiver clock bias offset to generate a negative-bias signal intensity hypercube plot.

5. The GNSS receiver of claim 3, wherein the STAC engine is further configured to:
adjust the receiver clock estimate if the receiver position is determined based on the at least one additional signal intensity hypercube plot.

6. The GNSS receiver of claim 1, wherein integrating the plurality of signal intensity curves within the spatial hypercube for the initial receiver clock estimate to generate a signal intensity hypercube plot comprises:
integrating the plurality of signal intensity curves along a line-of-sight of each signal of the plurality of signals through the spatial hypercube.

7. The GNSS receiver of claim 1, wherein determining a receiver position based on at the signal intensity hypercube plot comprises:
identifying a centroid of the signal intensity hypercube plot.

8. The GNSS receiver of claim 1, wherein the tracking engine is configured to determine the receiver position based on the plurality of signals when one or more signals of the plurality of signals exhibit a signal strength above a signal strength threshold value.

9. The GNSS receiver of claim 8, wherein the tracking engine is further configured to:
activate the STAC engine from an inactive state to an active state when each signal of the plurality of signals exhibits a signal strength below the signal strength threshold value, wherein the STAC engine is in the inactive state prior to activation.

10. The GNSS receiver of claim 9, wherein the tracking engine is further configured to:
deactivate the STAC engine from the active state to the inactive state when at least one signal of the plurality of signals exhibits a signal strength above the signal strength threshold value.

11. A method for determining a receiver position, comprising:
receiving, with a space-time adaptive correlator (STAC) engine running on an application-specific controller, initial position data from a tracking engine running on a primary controller;
receiving an initial receiver clock estimate from the tracking engine;
constructing a spatial hypercube within a spatial coordinate system based on the received initial position data;
receiving a plurality of signals from a plurality of satellites from the tracking engine;
interpolating signal strengths of the plurality of signals to generate a plurality of signal intensity curves;
integrating the plurality of signal intensity curves within the spatial hypercube for the initial receiver clock estimate to generate a signal intensity hypercube plot; and
determining a receiver position based on the signal intensity hypercube plot.

12. The method of claim 11, wherein the application-specific controller comprises at least one of an application-specific integrated circuit (ASIC) or a field programmable gate array (FPGA).

13. The method of claim 11, further comprising:
integrating the plurality of signal intensity curves within the spatial hypercube for one or more receiver clock bias offsets to generate at least one additional signal intensity hypercube plot.

14. The method of claim 13, wherein integrating the plurality of signal intensity curves within the spatial hypercube for one or more receiver clock bias offsets to generate at least one additional signal intensity hypercube plot comprises:
integrating the plurality of signal intensity curves within the spatial hypercube for a positive receiver clock bias offset to generate a positive-bias signal intensity hypercube plot; and
integrating the plurality of signal intensity curves within the spatial hypercube for a negative receiver clock bias offset to generate a negative-bias signal intensity hypercube plot.

15. The method of claim 13, further comprising:
adjusting the receiver clock estimate if the receiver position is determined based on the at least one additional signal intensity hypercube plot.

16. The method of claim 11, wherein integrating the plurality of signal intensity curves within the spatial hypercube for the initial receiver clock estimate to generate a signal intensity hypercube plot comprises:
integrating the plurality of signal intensity curves along a line-of-sight of each signal of the plurality of signals through the spatial hypercube.

17. The method of claim 11, wherein determining a receiver position based on at the signal intensity hypercube plot comprises:
identifying a centroid of the signal intensity hypercube plot.

18. The method of claim 11, further comprising:
determining the receiver position with the tracking engine based on the plurality of signals when one or more signals of the plurality of signals exhibit a signal strength above a signal strength threshold value.

19. The method of claim 18, further comprising:
activating the STAC engine from an inactive state to an active state when each signal of the plurality of signals exhibits a signal strength below the signal strength threshold value, wherein the STAC engine is in the inactive state prior to activation.

20. The method of claim 19, further comprising:
deactivating the STAC engine from the active state to the inactive state when at least one signal of the plurality of signals exhibits a signal strength above the signal strength threshold value.

* * * * *